(12) United States Patent
Arnold

(10) Patent No.: US 12,187,454 B2
(45) Date of Patent: Jan. 7, 2025

(54) ELECTRONIC FLIGHT ASSISTANT WITH OPTICAL READING OF FLIGHT INSTRUMENTS AND LASER MESSAGING, WITH OPTIONAL OPTICAL COLLISION AVOIDANCE, AUDIO WARNINGS, AUDIO CHECKLISTS, AND OTHER FUNCTIONS

(71) Applicant: Marc Arnold, Longmont, CO (US)

(72) Inventor: Marc Arnold, Longmont, CO (US)

( * ) Notice: Subject to any disclaimer, the term of this patent is extended or adjusted under 35 U.S.C. 154(b) by 380 days.

(21) Appl. No.: 17/519,559

(22) Filed: Nov. 4, 2021

(65) Prior Publication Data

US 2022/0135243 A1 May 5, 2022

Related U.S. Application Data

(60) Provisional application No. 63/110,315, filed on Nov. 5, 2020.

(51) Int. Cl.

| | |
|---|---|
| *B64D 43/00* | (2006.01) |
| *B64D 45/00* | (2006.01) |
| *B64D 47/08* | (2006.01) |
| *G01S 17/933* | (2020.01) |
| *G06V 20/17* | (2022.01) |
| *B64D 45/08* | (2006.01) |
| *B64D 47/02* | (2006.01) |
| *G01S 17/88* | (2006.01) |
| *G06V 10/143* | (2022.01) |
| *G06V 30/00* | (2022.01) |

(52) U.S. Cl.
CPC .............. *B64D 43/00* (2013.01); *B64D 45/00* (2013.01); *B64D 47/08* (2013.01); *G01S 17/933* (2013.01); *G06V 20/17* (2022.01)

(58) Field of Classification Search
None
See application file for complete search history.

(56) References Cited

U.S. PATENT DOCUMENTS 9,703,476 B1 *   7/2017  Pappas ................ G06F 3/04847
2016/0272341 A1 * 9/2016  Van Horn ............ G08G 5/0021
(Continued)

FOREIGN PATENT DOCUMENTS

WO    WO-2022074643 A1 *  4/2022

OTHER PUBLICATIONS

Singh, Amit Raj, "What is LiDAR and how does it work?", Feb. 16, 2018, Geospatial World (Year: 2018).*
(Continued)

*Primary Examiner* — Aniss Chad
*Assistant Examiner* — Madison R. Inserra
(74) *Attorney, Agent, or Firm* — Cozen O'Connor

(57) ABSTRACT

An electronic flight assistant device has a first processor coupled to a firmware memory containing machine readable instructions executable by the processor (Firmware) and a random access (RAM) memory; an electronic camera coupled to the processor;
a visible-wavelength laser adapted to be gated and scanned by the processor;
a switchable cockpit light; at least one digital radio coupled to the processor; and
a housing containing the processor, electronic camera, laser, digital radio, and cockpit light; the firmware configured to perform optical reading of cockpit instruments, to determine error conditions, and to scan the laser to provide indications to a pilot of error conditions.

11 Claims, 8 Drawing Sheets

(56) References Cited

U.S. PATENT DOCUMENTS

| | | | |
|---|---|---|---|
| 2017/0291716 A1* | 10/2017 | Buethe | H04N 7/183 |
| 2019/0017658 A1* | 1/2019 | King | B60Q 3/00 |
| 2020/0082731 A1* | 3/2020 | Choi | G05D 1/0088 |
| 2020/0118366 A1* | 4/2020 | Ryan | G07C 5/0866 |
| 2021/0311713 A1* | 10/2021 | De Meulder | B64F 5/60 |

OTHER PUBLICATIONS

Hirschman, "Technology: Ipad Best Practices Making Technology Work for You", AOPA Pilot Magazine Nov. 5, 2014, 5 pages.

\* cited by examiner

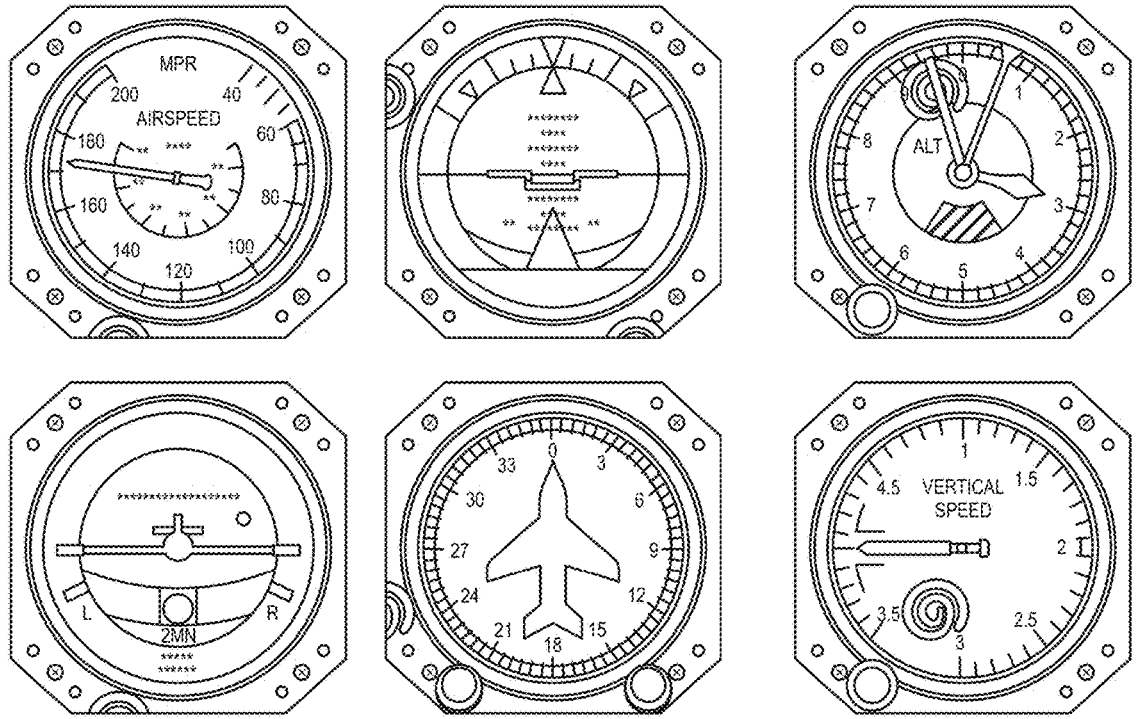
FIG. 10
| FUEL | AP FAIL | GENE | PITOT | MGB TEMP | ENG CHIP | ENG P | ENG FIRE |
|------|---------|------|-------|----------|----------|-------|----------|
| FUEL P | TRIM FAIL | BATT | HORN | DOOR | MGB CHIP | MGB P | BATT TEMP |
| FUEL FILT | GYRO FAIL | == | TWT. GRIP | GOV | TGB CHIP | GOV | HYDR |
FIG. 11
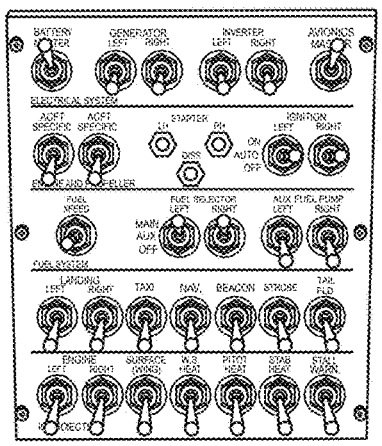
FIG. 12

ELECTRONIC FLIGHT ASSISTANT WITH OPTICAL READING OF FLIGHT INSTRUMENTS AND LASER MESSAGING, WITH OPTIONAL OPTICAL COLLISION AVOIDANCE, AUDIO WARNINGS, AUDIO CHECKLISTS, AND OTHER FUNCTIONS

CLAIM TO PRIORITY

This document claims priority to U.S. Provisional Patent Application No. 63/110,315 filed 5 Nov. 2020, the entirety of which is incorporated by reference herein.

BRIEF DESCRIPTION OF THE FIGURES

FIG. 10 illustrates a typical "6-pack" layout of flight instruments, including a horizontal situation indicator (HSI) or artificial horizon.

FIG. 11 illustrates cockpit warning lights as they may appear in some cockpits of complex aircraft.

FIG. 12 illustrates cockpit control switches as they may appear in some cockpits of complex aircraft.

DETAILED DESCRIPTION OF THE EMBODIMENTS

Figure 1:
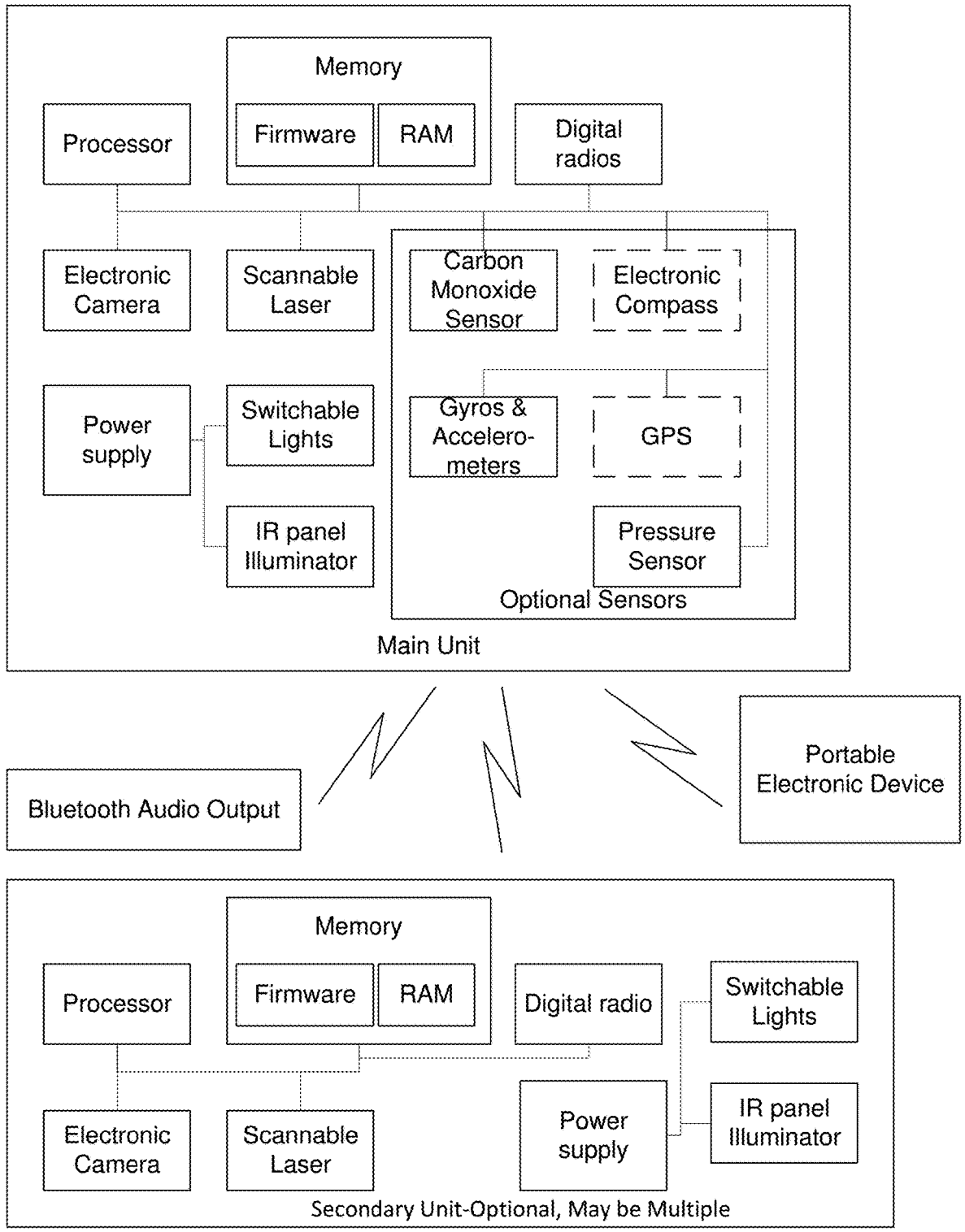
FIG. 1 is a block diagram of an electronic flight assistant system.

FIG. 1 illustrates a block diagram of an electronic flight assistant system including a main unit and zero, one, two, or more secondary units. The main and secondary units have at least two modes of operation, a configuration mode and a flight mode.

The main unit is typically positioned as a replacement for a cockpit dome light in an aircraft and may be used alone if it has an unobstructed view of the aircraft's instrument panel despite most likely positions of aircrew in the cockpit; secondary units linked to the main unit may be provided to supplement the main unit where the main unit lacks an adequate view of the aircraft's instrument panel. Both main and secondary units have a processor, a scannable laser configurable to display indications on the aircraft's instrument panel, a memory system including a firmware and a RAM memory, an electronic camera that can image in at least the near infrared and in most systems in the visible spectrum, at least one digital radio, a near infrared illuminator, and a power supply coupled to provide power to all electronics of the unit, the near infrared illuminator, and one or more switchable, visible-wavelength, lights for providing human usable cockpit illumination. For configuration mode and optionally during flight mode, the main unit communicates through its digital radios to a portable electronic device using the IEEE 802.11 "WiFi" protocols and frequencies. During flight mode, the main unit communicates with a Bluetooth audio output device coupled into an audio system usable by aircrew that permits aural warning messages generated by the main unit to be heard by the aircrew. In during flight mode, the main and secondary units communicate with each other via their digital radios.

Embodiments of the main unit may include one or more additional sensors including a pressure sensor such as is useful to determine a cabin pressure altitude, a carbon monoxide sensor, an electronic compass, and a simple global positioning system (GPS) navigational receiver. In embodiments, the additional sensors include accelerometers, and electronic gyroscopes sufficient to provide flight attitude information.

In most embodiments, the main unit is configured in a housing configured to replace a cockpit dome light as provided in many models of single and twin-engine aircraft.

The firmware configures the processors of the main and any equipped secondary units to operate together to provide all functions described herein.

Problem Statement

Many General Aviation pilots operate older, less expensive, aircraft and are forced to live in the past: They maintain situational awareness (SA) using old-fashioned individual "steam gauge" instruments that haven't changed in decades. They are well informed about and want Integrated Flight Management Systems embodied in modern "glass cockpits" but can't afford to acquire newer aircraft or retrofit modern avionics.

Current Solutions Don't Apply

Newer, more expensive, aircraft address this problem through advanced avionics suites that collect information from navigation, communication and aircraft systems through shared data buses, then present information on integrated displays that are easy to monitor and provide advanced guidance and alerts. These updated avionics solutions deliver dramatically advanced human-machine interfaces, but they can't be economically retrofitted to older less expensive aircraft. Rewiring certified aircraft to incorporate an integrated data bus is impossible due to prohibitive cost and certification hurdles.

Good News: There is a Different and Better Solution

Installed in the dome light cockpit location, a Cockpit Multi Sensor (CMS) uses low-cost optical machine vision to monitor instrument readings and control positions, then broadcasts a wireless stream of readings to one or more in-cockpit portable devices. The CMS also interfaces with existing audio transmit/receive transmissions for two-way communication with the pilot. Additional CMS sensors can acquire and deliver further SA benefits. The CMS "virtual data bus" will uniquely enable a host of advanced capabilities that can be delivered without cost prohibitive aircraft rewiring to create an extensible strategic platform upon which an array of new products and services can be launched.

Introduction

As of Q3 2020, avionics sales were down 33% year-to-date largely due to the Covid-19 pandemic according to the Aircraft Electronics Association (AEA). The retrofit market, however, was up by 11%. This suggests there is an ongoing demand for upgraded capabilities, even during an economic downturn. A family of products built around and exploiting the data derived from the device described herein will open significant growth opportunities.

Owners of existing general aviation aircraft are aware that newer, upscale, aircraft are often equipped with an impressive array of "glass cockpit" avionics, but these capabilities remain beyond their reach because retrofitting a fully integrated data bus that can monitor controls and indicators is cost prohibitive. Owners of more than 200,000 US General Aviation aircraft represent a significant market opportunity awaiting a new layer of automation by retrofitting existing general aviation aircraft with a low-cost device that 'scrapes' pre-existing analog cockpit indicators and controls to gather flight information.

The resulting virtual data bus enables numerous advanced capabilities without the need to retrofit a costly integrated data bus architecture. Once installed, the base unit enables a valuable progression of hardware and software upgrades that will deliver increasing capabilities.

CMS Product Concept

Figure 2:
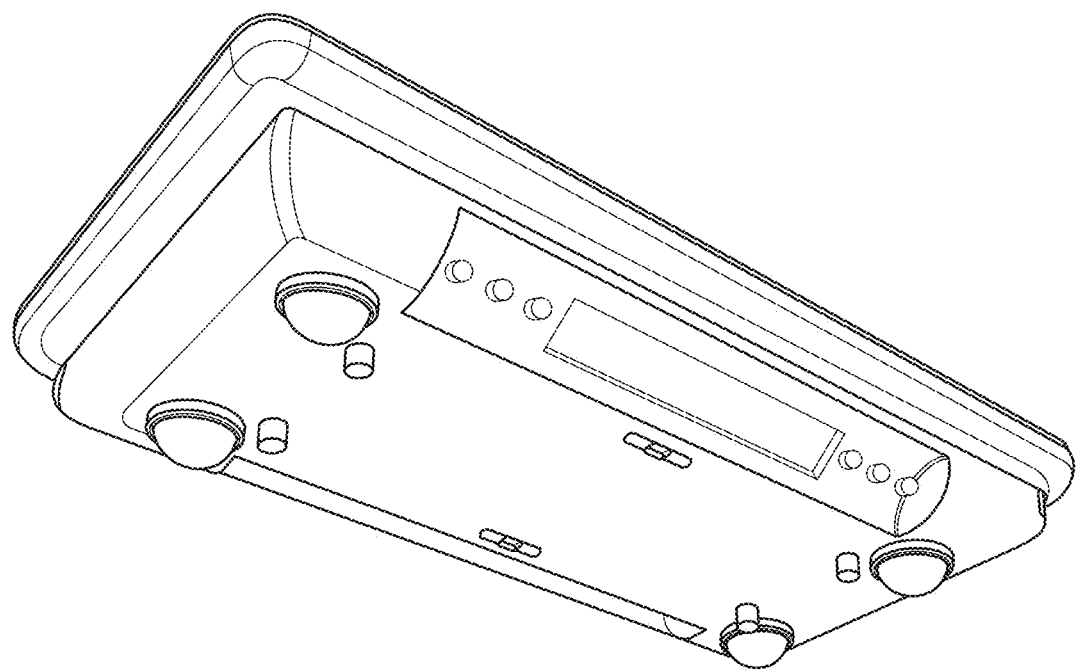
FIG. 2 is a photograph of an electronic flight assistant system mounted on a cockpit overhead where it can view cockpit instruments.
Figure 3:
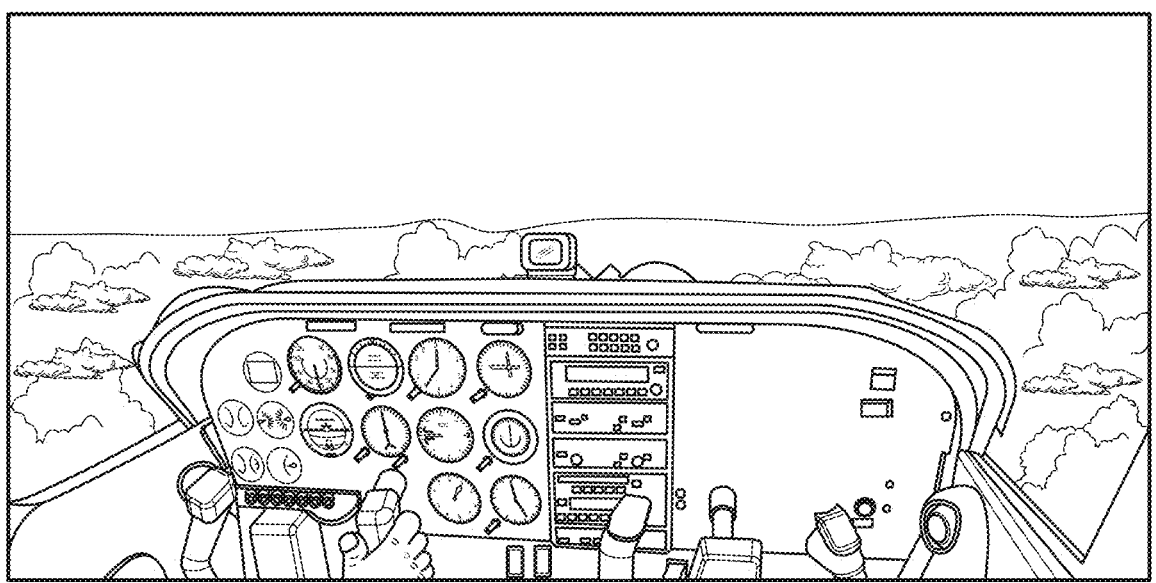
FIG. 3 is a photograph illustrating view of a small-aircraft instrument panel as seen from a dome-light position.

In recent years, the avionics industry has seen introduction and rapid adoption of several iPad-compatible sensors (e.g. GPS, AHRS, ADS-B IN, AOA). In view of these successes, a new and attractive class of capabilities can be offered to general aviation users by integrating a host of readily available sensors and capabilities into a non-certified Cockpit Multi Sensor (CMS) (FIG. 2) that exploits the traditional ceiling mounted dome light position from which it has an excellent view of the pilot's instrument panel (FIG. 3). Seizing this valuable real estate paves the way to an array of capabilities that result from increased iPad application awareness of aircraft status. Numerous features are described later in this document. To begin, consider Initial Basic and subsequent Advanced Capabilities:

CMS Basic Lighting Capabilities: The market entry version offers limited functionality. Subject to further study, the initial configuration may only supply an assortment of lights: White Cockpit Flood Light, Red Cockpit Flood Light, Pilot Map Light, Co-Pilot Map Light, Passenger Reading Lights, and General Cabin Light.

CMS Advanced Capabilities: Over time, CMS functionality will grow. Potential features are described below which might be incorporated in future CMS models. The wide variety of possibilities demonstrates the long-term value of a plug-and-play overhead installation. The decision regarding which of these will be developed will follow feasibility, cost and market analyses. Future enriched CMS functionality could eventually grow to include some or all the following: Cockpit Panel Optical Instrument Recognition and Reading, Optical Collision Avoidance, Peripheral Vision Horizon Display, Cabin Altitude Sensing/Warning, CO Sensing/Warning, Pilot Voice Input and Bluetooth Audio Output, Laser Messaging, and Ride Reporter.

CMS may be viewed as a stand-alone business, or it can be viewed as Phase Zero of the multi-phase "Electronic Pilot Assistant" concept described elsewhere. With the foregoing in mind, there is a significant opportunity to develop and market a Cockpit Multi-Sensor (CMS) product. CMS is a sophisticated sensor suite that can collect, analyze and forward a new and higher level of situational awareness. With this enhanced awareness, applications can monitor the situation and advise the pilot. Underlying this product idea are the following premises:

a) general aviation aircraft are equipped with a center-mounted ceiling dome light, b) existing dome lights are powered by the aircraft electrical system (14 or 28 v), c) replacing a dome light with an electronic device in the same location will be eligible for installation using a variety of approval methods including Field Approval (Form 337), Approved Model List (AML) and Supplemental Type Certificate (STC), d) no required aircraft equipment will be removed (except the pre-existing light, which will be functionally replaced), e) CMS derived information will be provided to the pilot on an advisory-only basis, f) the dome light position provides a bird's-eye view out the front windscreen and the cockpit panel, including most of the aircraft instruments, controls and switches, g) WiFi and Bluetooth enabled Personal Electronic Devices (PEDs) are commonplace on general aviation flight decks, h) headset/microphone Bluetooth-enabled break-out boxes are widely available, i) a mounting ring will be attached to the airframe, j) once installed, future CMS versions can be offered as plug-and-play upgrades (either as a means of increasing functionality, or to adapt to future iOS/Android hardware changes), k) the center ceiling location is valuable real estate that, once occupied, will remain a default location for introducing evolving features, l) side mounted auxiliary CMS sensor units will fill-in optical blind spots to augment optical instrument reading where necessary, and permit use in aircraft without dome lights (primarily open cockpit and Plexiglas bubble canopies), m) acquisition of fleet-wide pilot, aircraft and engine operational data will have added value in the long run.

CMS accumulates and processes information derived from the cockpit environment and forwards that information via WiFi to other portable display devices such as iPads. In addition to direct sensing of atmospheric pressure, carbon monoxide, acceleration forces and aircraft attitude, CMS makes use of machine vision, a well-established technical domain that allows real-time assessment of visual inputs. In the cockpit environment, this will mean an ability to translate legacy "steam gauges", switch positions and control positions. Applications with greater awareness of activities on the flight deck will usher in a new level of Electronic Flight Bag (EFB) capability as described in more detail below. These steps will lead in the direction of the Electronic Pilot Assistant (EPA) product described elsewhere.

While introducing traditional avionics requires an elaborate approach to certification, CMS will not require traditional avionics certification. This lowers development costs and shorten time-to-market, while opening the possibility of early revenues. In the long run, widespread use of early versions of CMS will provide valuable lessons that may be migrated to more elaborate certified versions in the future.

CMS: Hardware Configuration

CMS delivers a combination of Basic and Advanced capabilities which consist of certain stand-alone features, grant iPad applications greater information regarding flight status and yield certain information output abilities.

A CMS installation is comprised of two or more components: One CMS Core Unit, one CMS Audio Unit and, optionally, one or more CMS Aux Units. Sensors and processors will be integrated into these devices from COTS components and further research will establish price and availability. The data acquired by these devices are processed into a standardized CMS Wireless Data Bus and made available to one or more WiFi enabled devices, typically an iOS iPad. The analytic software that reduces the raw input from these sensors to useful data, the CMS communication protocol and the unique configuration of hardware will be proprietary to the CMS venture.

CMS Core Unit

An A&P mechanic removes the existing dome light and installs a CMS-specific mounting ring in its place making an aircraft logbook entry with a corresponding Form 337 field approval. The mounting ring is connected to the existing aircraft wiring which previously powered the dome light (14 or 28 v). In some cases, a bulb-compatible adapter may permit use of the existing dome light fixture. A variety of mounting rings are offered which lend themselves to differing aircraft installations. The mounting ring provides an aircraft-independent snap-in fitting for easy plug-in installation of the CMS Core Unit.

While the outer dimensions of aircraft vary widely, interior cockpit geometry and dimensions fall within a relatively narrow range. As a result, the distance from camera to instrument panel and required field of view is consistent across many different makes and models of aircraft. Although the dome light position is the preferred embodiment, pilot preferences and variations among cockpits will lead to a host of unique adapters and mounts, just as iPad mounts can now be found that attach to windows, control yokes, pilot lap desks, etc. In those aircraft where ceiling-to-windscreen geometry interferes with a clear view forward, an articulated mounting ring adapter will allow the CMS Core Unit to swing up for ingress/egress and swing down for an unobstructed field of view in flight.

The snap-in feature permits easy movement of the CMS Core Unit between multiple aircraft or removal between flights for security. Each ring has a unique machine-readable non-volatile identification. Upon startup, an aircraft configuration file unique to that aircraft/mounting ring informs the CMS Core Unit which aircraft it is currently installed. The pilot can swap CMS Core Units within seconds to permit easy upgrades as new features and capabilities evolve. The WiFi capability of the CMS Core Unit permits uploading of operational and configuration data from the aircraft to the company and periodic firmware updating via online downloads.

The CMS Core Unit is equipped with a rechargeable battery which provides 60-minute backup power and illumination when the aircraft master is off. Where connection to the aircraft power is problematic, an optional mounting ring compatible 10-hour battery module is available for electrically independent operation.

All CMS Core Units perform the basic function of cockpit lighting. Openings on the front of the unit allow light to project downward and forward. On/off/dimmer switches control white flood light, red flood light, left map light, right map light, rearward facing passenger reading lights and general cabin light. Lights can operate on battery power and automatically shut off after 10 minutes of unpowered use to facilitate night-time ingress/egress without aircraft power.

Depending on more detailed market research, cost analysis and a technical development roadmap, the following hardware elements will be incorporated in CMS Core Unit releases:

CMS Processor incorporating an embedded processor, similar to the Qualcomm Snapdragon mobile processor, which includes fast computation, high resolution video capture (4K @ 30 fps), graphics processing (video), digital signal processing, wired connectivity (USB), onboard storage (LPDDR3) and wireless communications (WiFi, Bluetooth, NFC);

Speaker to issue audio tones and voice messages;

Standby battery power to mitigate momentary power interruption and power cabin lights when aircraft power is off;

Visible light camera staring through a forward-facing orifice at the instrument panel and out the front windshield;

Infra-red illuminator shining on the instrument panel;

Infra-red camera staring through a forward-facing orifice at the instrument for night-time and low-light operation;

Scanning low powered laser, capable of shining program-controlled monochromatic patterns and images on the instrument panel;

Pressure altitude sensor; Accelerometers (G-force sensors);

Carbon Monoxide (CO) sensor; and,

Built-in attitude, heading reference (AHRS) source.

CMS Audio Unit

Figure 4:
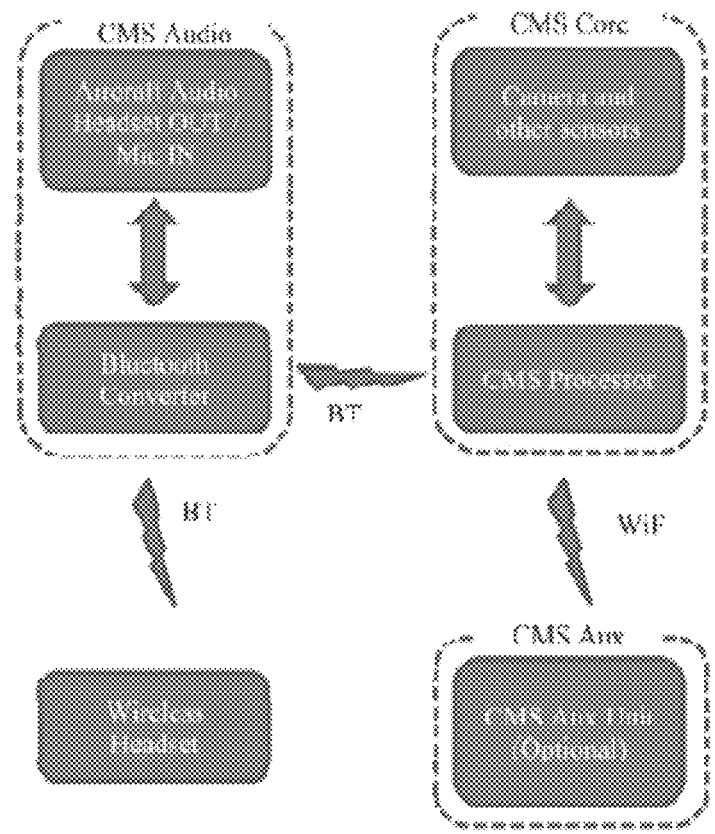
FIG. 4 is a block diagram illustrating communications between blocks of the electronic flight assistant system.
Figure 5:
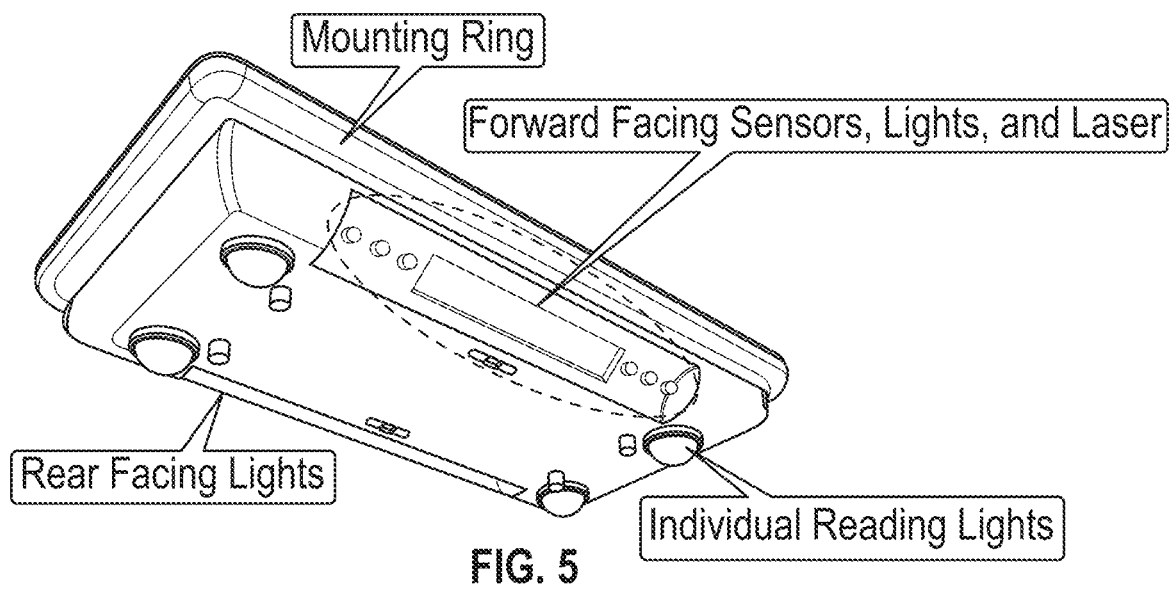
FIG. 5 is an illustration of a mounting ring with a removable electronic flight assistant system.

All configurations include at least one CMS Audio Unit. At a minimum, the CMS Audio Unit plugs into the existing aircraft headphone/microphone jacks and converts analog audio to a bi-directional digital Bluetooth stream. It may be designed specific to the CMS installation, or an existing design may be used as shown in FIG. 4, below. The CMS Audio Unit can be battery powered or connected to aircraft power. It is paired with the CMS Core Unit, permitting the CMS Processor to listen to spoken words from the ATC transmissions, pilot and output audio tones and system voice messages. One or more additional CMS Audio Units may be paired for co-pilot and/or passenger use.

CMS Aux Unit

In some installations, the CMS Core Unit may be replaced or augmented by one or more CMS Aux Units, which are designed to mount to the left or right of the cockpit using alternate mounting rings. The purpose of CMS Aux Units is two-fold: First, it permits installation in aircraft lacking a conventional overhead dome light, addressing the needs of open cockpits and bubble canopies. Second, Left/Right CMS Aux Unit(s) can address momentary or continuous instrument panel blockage by concurrently streaming video from alternate vantage points. Depending on more detailed product design, CMS Aux Units may be a different dedicated design or may be identical to CMS Core Units with configuration changes.

Figure 6A:
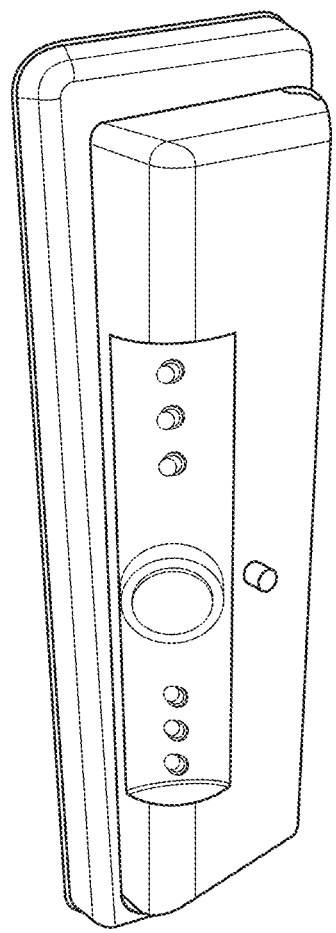
FIGS. 6A and 6B illustrate auxiliary electronic flight assistant units that work with a primary flight assistant unit like the unit in FIG. 2.
Figure 6B:
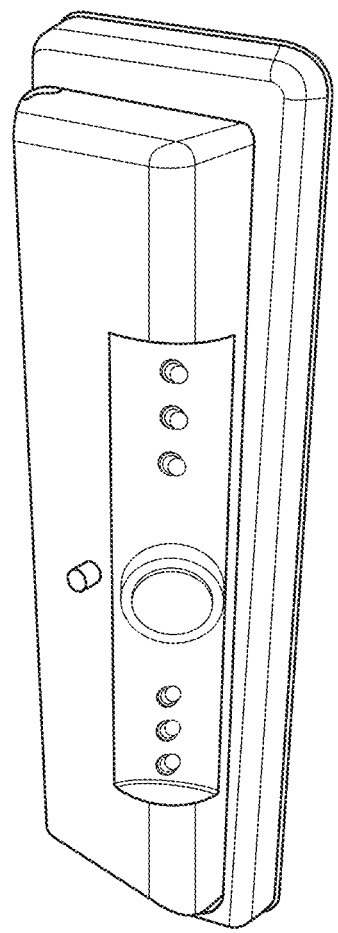

The notional design of FIG. 6A and FIG. 6B depicts a unit about half the size of the CMS Core Unit. It can be mounted on the left or right cockpit sidewall. It only faces forward and does not include a laser based Peripheral Vision Horizon Display (PVHD).

Since electrical power is not typically available on cockpit sidewalls, installations of CMS Aux Units will require running a dedicated electrical circuit. For experimental aircraft, this will not require special approvals. In the case of certified aircraft, this will be a more invasive change than the ceiling dome light location but could nevertheless be done by an A&P mechanic issuing a Form 337 field approval, a process that is much more lenient than acquiring a Supplemental Type Certificate (STC).

CMS Basic Lighting Capabilities: Functional Description

Upon installation, the CMS Core Unit immediately performs six lighting tasks, each task performed by one or more dimmable LED's: White Cockpit Flood Light (full forward illumination using white light), Red Cockpit Flood Light (full forward illumination using red light), Pilot Map Light (narrow white light that can be aimed at the pilot's lap), Co-Pilot Map Light (narrow white light that can be aimed at the co-pilot's lap), Rear-facing Passenger Reading Lights, and General Cabin Light (white light for general cabin illumination). When unpowered by the aircraft electrical system, a self-timer turns off lights after 10 minutes of use.

CMS Advanced Capabilities: Functional Description

Powered by the same circuit which energizes the basic lighting features, the CMS Core Unit includes additional hardware which enables advanced functions. The sequence of implementation is subject to further study. Functional descriptions of these features follow:

Cockpit Panel Analog Instrument Optical Recognition

Machine vision technology can be adapted to acquire information from optical imagery in the cockpit in spite of challenges such as vibration, glare, differing lighting, variation in instrument design, etc. It is likely this capability will be the "killer app" for CMS. Just as the advent of GPS-enabled moving maps enhanced situational awareness outside the cockpit, an iOS or Android app that can monitor and interpret aircraft systems will enhance situational awareness inside the cockpit. Since the interface is purely non-invasive machine vision, a failure of CMS or the EFB will not harm or disable existing aircraft systems. No matter how wonderful future CMS-enabled EFB's become, its benefits will always be advisory in nature and never jeopardize safety of flight.

Newer and more expensive aircraft enjoy the benefits of "glass cockpits" with increasing levels of integration and connectivity. For all but the most expensive aircraft, private aircraft will never be equipped with full suites of modern avionics. Avionics upgrades typically only replace a subset of the instruments leaving most of the legacy instruments in place. Installing a relatively inexpensive CMS device capable of analog instrument recognition, however, will effectively 'upgrade' the capabilities of all the installed instruments. A pilot experiencing this level of integrated situational awareness will in some ways feel s/he has technologically leapfrogged ahead. CMS will enable a comprehensive upgrade at an affordable cost.

Regardless of aircraft make and model, proprietary CMS configuration software will allow aircraft-independent machine vision to interpret elements of the cockpit. Whether installed in a Cessna or a Piper, for example, an oil pressure gauge conveys the same information. Once configured, each instrument's information becomes available to connected iPad devices via the CMS Wireless Data Bus which functions in a manner similar to the ARINC 429 data bus standard (a cost prohibitive option for older and less valuable aircraft).

Just as access to GPS data permitted EFB applications to 'understand' present position, the CMS system will use machine vision to interpret traditional analog "steam gauge" instruments, converting needle positions to numerical values and supplying that digital information in a stream of wireless data to connected devices. This enhanced awareness will enable a new level of application 'awareness'.

Mounted on the ceiling above and behind the pilots, visible light and infra-red cameras in the CMS Core Unit have an excellent view of the instrument panel. CMS Aux Units, if installed, view the instrument panel from the left and/or right-side walls. These video images from the side wall(s) are orthorectified, combined and analyzed by the CMS Processor.

Figure 7:
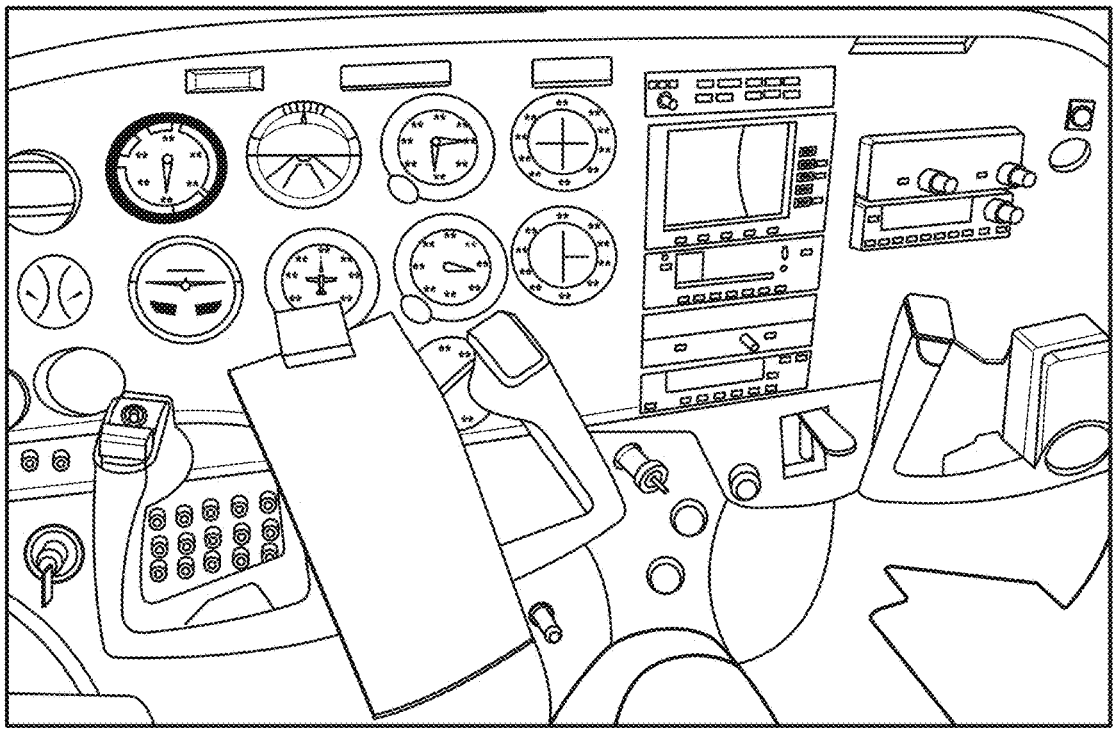
FIG. 7 illustrates an image of an instrument panel with a particular instrument selected.

Prior to first use, the pilot uses a laptop to connect to the CMS Core Unit and execute a one-time configuration process for that plane. The pilot identifies each instrument, switch and control within view of the CMS camera(s). If already present in the CMS instrument database (previously specified by other CMS users), configuration of that instrument is done. If not, the pilot sets key values for that instrument. Once defined, the CMS system uses machine vision to analyze and convert analog gauges to digital values. For example, with reference to FIG. 7:

The pilot clicks on an instrument as seen by the CMS camera. The CMS configuration software seeks for a matching instrument in a database of instruments to determine what is represented and how it is displayed.

Figure 8:
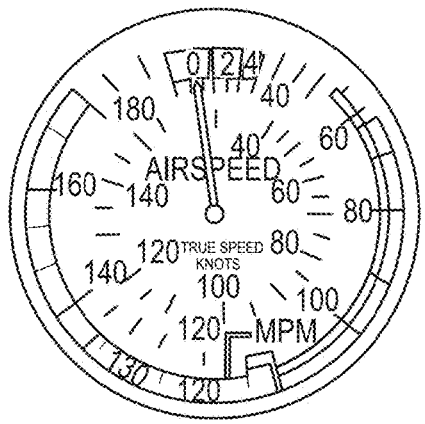
FIG. 8 illustrates the airspeed indicator selected in FIG. 7 as used for character recognition and value extraction.

The CMS configuration software, in this case, fails to find a match for the instrument, then presents an enlargement of the instrument to solicit key values from the associated instrument, as illustrated in FIG. 8, so that key values can be extracted as illustrated in Table 1.

TABLE 1

| Value | Units (mph) |
| --- | --- |
| Vso | 54 |
| Vs clean | 63 |
| Va | 140 |
| Vne | 171 |

Henceforward, the CMS system will interpret the pointer position and transmit a digital airspeed value equal to the value shown by needle position on the airspeed instrument. If, for example, there were a second airspeed indicator on the instrument panel, it will be a simple matter for the EFB software to provide an "AIR SPEED DISAGREE" warning if there were a significant divergence between the two instruments—a function commonly found among high-end avionics suites, but non-existent on aircraft equipped with older steam gauges.

Figure 9:
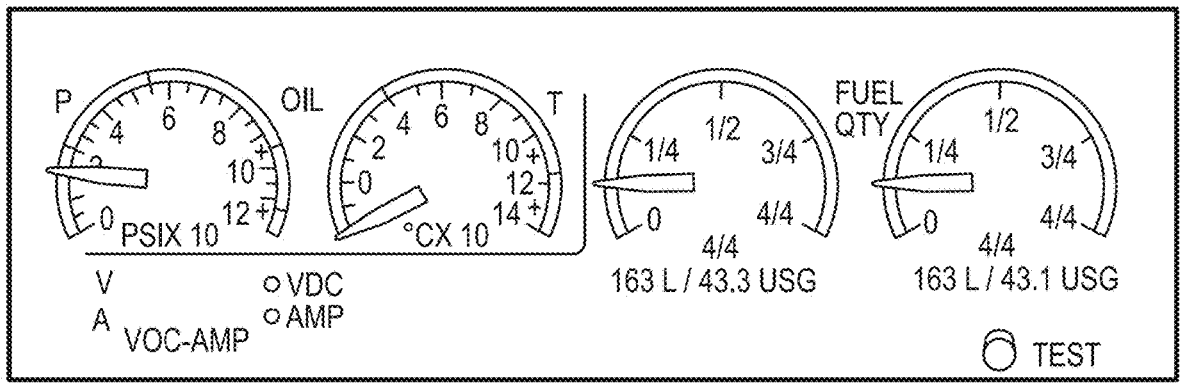
FIG. 9 illustrates typical piston-powered airplane engine instruments as they may be imaged for character recognition and value extraction.

There are many cockpit instruments, but many engine and system related gauges have a similar set of markings representing minimum, maximum and normal operation range. These are often indicated as colored arcs and lines as illustrated in FIG. 9.

Likewise, legacy flight instruments often have similar characteristics and even similar layouts, as illustrated in FIG. 10.

As makes and models of instruments are defined, the CMS will establish a self-populating database of instrument definitions. Categories supported by the configuration software will grow to include:

Airspeed Indicators
Altimeters
Ammeters
Angle Of Attack Indicators
Attitude Indicators
Cabin Air Differential Pressure Gauges
Carburetor Air Temp Gauges
Chronometers/Clocks
CHT Gauges
Compasses Cowl Flap Position
Directional Gyros
EGT Gauges
Engine Monitoring Systems
Flap Position Indicators
Fuel Instruments
Hour Meters
Horizontal Situation Indicators
Hydraulic Pressure Gauges
Manifold Pressure Gauges
Mixture Lever Position
Oil Gauges
Outside Air Temp Gauges
Pressure Gauges
Slip Indicators
Stall Warning Systems
Suction Gauges
Switches
Tachometers
Temperature Gauges
Throttle Lever Position
TIT Gauges
Turn & Bank Indicators
Turn Coordinators
Vertical Speed Indicators
Voltmeters Dashcam Flight Recording Forward looking video allows the CMS to record flight for later playback by the pilot. This is a popular application and is already being addressed by a variety of in-flight video cameras mounted internally or externally.

Cockpit Warning Light Optical Recognition

In addition to extracting values from analog gauges, value can also be derived from identifying illuminated warning lights as illustrated in FIG. 11. For each model aircraft, the illumination of a given warning light is associated with a specific checklist procedure. Modern high-end avionics systems are designed with an emphasis on system integration and are often able to automatically present emergency response procedures, but this capability is non-existent in legacy general aviation aircraft. Like the analog instrument definitions, each warning light can be defined through the CMS configuration procedure and linked to an appropriate abnormal checklist presentation, either visually on the iPad or aurally through the headset. Pilots loading checklists will lead to a self-populating database of aircraft models containing normal, abnormal and emergency checklist items.

The identities of cockpit switches within the CMS camera(s) field of view(s) are also configured for automatic monitoring; an embodiment of cockpit switches is illustrated in FIG. 12. Switch positions are monitored and changes in value are added to the CMS information flow. When the pilot calls for a Flowcheck, the position of switches can be verified automatically.

We note each switch and each warning light typically is associated with text on a placard indicating its identity and function; this text can be subjected to optical character recognition.

Optical Collision Avoidance

The USAF recently contracted with a Denver area contractor to develop an optical collision avoidance system for use on its drones so they can operate in the National Air Space and still comply with the FAA requirement to "see and avoid" other traffic. The author operated one of the research aircraft performing in-flight intercepts to gather data for this project. The contractor retained the commercial rights to the work and elements of the system will make it possible for a single camera to provide a measure of "see and warn" capability during daylight visual meteorological conditions.

A more robust system would employ wingtip mounted cameras to acquire a stereoscopic view of approaching traffic. Given the proposed single-camera CMS installation, the time available to react after an alert will be shorter. Nevertheless, licensing and applying this technology will permit the CMS Core Unit to process forward looking video imagery and search for potential conflicting traffic to mitigate the risk of mid-air collision. Augmenting ADS-B and other collision avoidance systems, CMS will be welcomed as a "another set of eyes in the cockpit".

Figure 13:
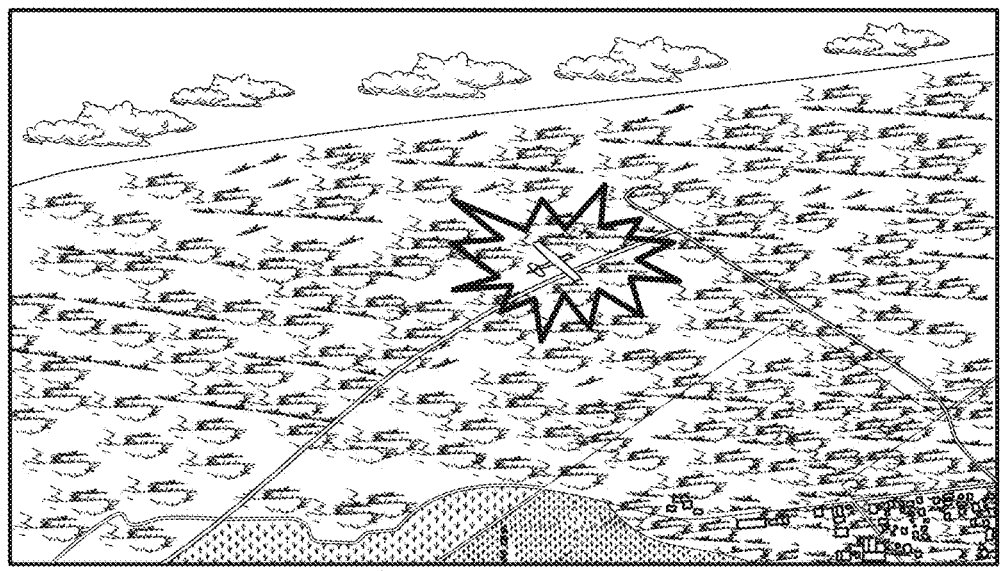
FIG. 13 illustrates tracking of another aircraft.
Figure 14:
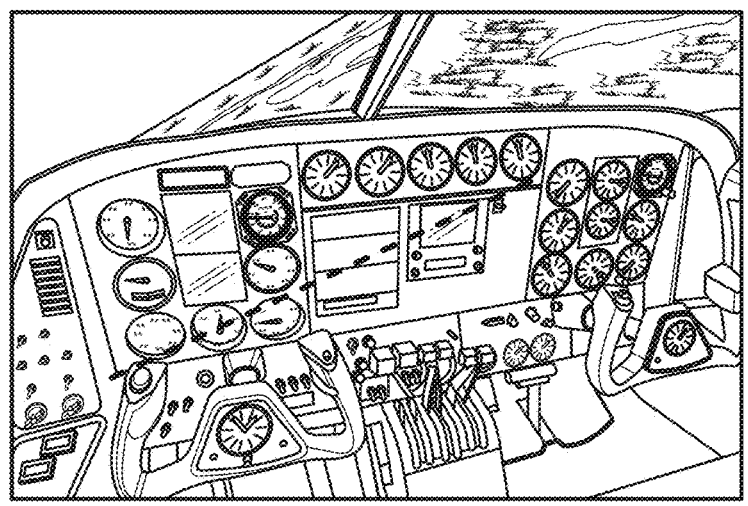
FIG. 14 illustrates laser tracing an artificial horizon with a laser on the instrument panel.
Figure 15:
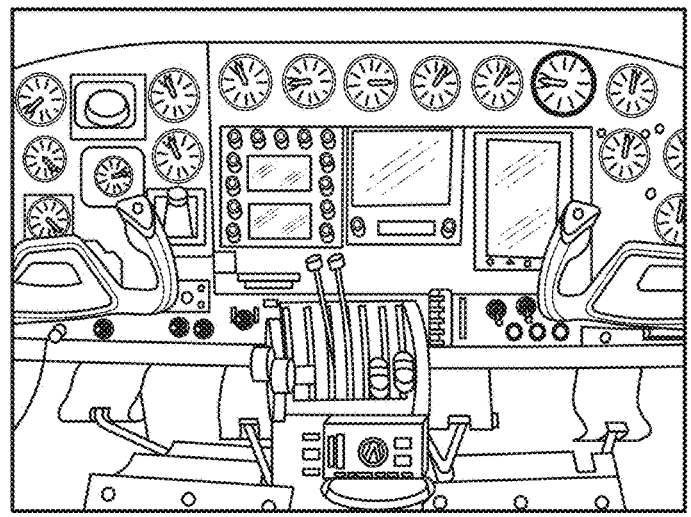
FIG. 15 illustrates laser highlighting of an instrument that requires attention from the pilot.

Depending on CMS configuration, traffic alerts can be issued via: WiFi notification of the EFB application, audio tone or voice via the CMS Audio Unit or audio callout via the CMS Core Unit speaker, or by laser display on the windshield as seen in FIG. 13.

Peripheral Vision Horizon Display (PVHD)

Government research confirmed that a faint laser line synced to the horizon can subliminally cue the pilot to improve situational awareness. At various times, PVHD has been deployed on SR-71, A-10, F-16, F-111, F-15 and other front-line fighter aircraft with success. The CMS Core Unit is equipped an independent AHRS and can project a laser line across the instrument panel signifying the horizon. As the plane maneuvers, the line tilts L/R and Up/Down to remain in sync with the actual horizon. The line is broken in segments which move left or right to reflect changes in aircraft heading. The portion of line that would otherwise strike the primary flight instruments is missing. The brightness is set very low so the line is barely visible. Proper use of PVHD does not require the pilot to include the laser line while scanning the instruments. Rather, the edges of the pilot's peripheral vision subtly inform the pilot about aircraft attitude without conscious effort.

Cabin Altitude Sensing/Warning

The CMS Core Unit is equipped with an air pressure sensor and can determine pressure altitude of the cabin. This measurement is transmitted on the CMS Wireless Data Bus. A critical altitude can be specified above which the PVHD laser can be set to flash "02" on the instrument panel as a visual warning.

CO Sensing/Warning

The CMS Core Unit is equipped with carbon monoxide sensor and can determine the presence of CO in the cabin. This measurement is transmitted on the CMS Wireless Data Bus. A critical CO concentration can be specified above which the PVHD laser can be set to flash "CO" on the instrument panel as a visual warning.

Pilot Voice Input and Bluetooth Audio Output.

"Audio OUT" produced by the on-board avionics system (VHF voice communication and other navigational audio) that would normally be routed to a pilot's headset is intercepted by the CMS Audio Unit, then re-broadcast as a digital Bluetooth signal. "Audio IN" captured by the pilot's microphone is digitized and sent via Bluetooth to the CMS Audio Unit.

Both "Audio IN" and "Audio OUT" content is intercepted and available to the CMS Core Unit for natural language processing. In addition, the CMS Core Unit can transmit tones and audio messages to the pilot, making this audio relay function quite important. When possible, CMS audio messaging will await a break in normal communication (store and forward) and favor one ear to help clarify the source. This audio channel will also be available to the iOS/Android EFB application to facilitate audio communication.

Laser Messaging

The CMS Core Unit is configured with a detailed map of the instrument panel. That map is constantly registered during its real-time analysis of the plain light and IR video. It is also equipped with a scanning laser capable of projecting the (PVHD) artificial horizon line. When needed, the laser can be repurposed to highlight switches, controls or instruments. As part of an abnormal checklist, for example, the system can highlight actions needed to address the circumstances. This limited messaging capability will be available to the EFB application.

Ride Reporter

The CMS Core Unit is equipped with accelerometers capable of measuring G-force accelerations. Analysis of this sensor data will permit the collection, analysis, storage and transmission of recent turbulence data using an objective measure of turbulence. Encoded ride information will be added to outbound VHF transmissions via Data Under Voice (DUV) or appended as short bursts of digitally encoded data at the conclusion of outbound radio transmissions.

Similarly, equipped aircraft on the same frequency will receive this ride quality information. This viral transmission of ride quality information will permit an EFB application to display a geo-referenced map of turbulence, permitting pilots to make better-informed decisions about their flight path choice. See Appendix B for a more detailed discussion regarding the potential workings of the Ride Reporter function.

Potential CMS-Enabled EFB Capabilities

The scope of this Cockpit Multi Sensor document is somewhat limited. It hopes to describe a comparatively low-cost sensor package that can be developed and deployed to the general aviation community. Much of this document has focused on the hardware and capabilities of the sensor package itself. The perception of value and marketability by members of the aviation community, however, will have little to do with how CMS senses its environment. Instead, potential buyers will be interested in what it can do for them in practical terms.

Building dedicated iOS/Android applications that fully utilize the CMS Wireless Data Bus is one strategy. Alternatively, CMS can follow in the footsteps of sensors such as Appareo's Stratus, i.e. enable other EFB developers to exploit the CMS Wireless Data Bus to enhance their products. This section explores possible uses EFB applications that might make use of data derived from the CMS system. New sensor data from CMS, combined with creative unregulated EFB programming will have a profound effect on general aviation. Even legacy aircraft with old fashioned steam gauges will have many of the benefits of modern fight deck automation.

FlowChecks . . . Not Checklists

Audio checklists have been available for years. A checklist item is spoken, and the pilot responds by pushing one of three buttons signifying: Check, Skip or Repeat. This requires an action by the pilot for each checklist item which can increase workload and clutter the audio channel for the pilot, interfering with ATC communications. In a two-pilot crew, however, the Pilot Monitoring (PM) performs the checklist items from memory (a so-called "flow") and only demands a response from the Pilot Flying (PF) on selected items which either require the pilot to perform a function on his/her side of the cockpit or are safety of flight critical, demanding that both pilots concur. In the single pilot CMS equipped environment, the pilot will perform a phase of flight "flow", then ask for a "FlowCheck". Since CMS will supply the position of switches and controls, a CMS-enabled EFB will be able to verify the completion of the required checklist items and only annunciate items that were missed by the pilot or which cannot be detected by the CMS. The result will be the assurance that normally comes from having another pilot looking for 'something amiss', while adhering to the dark/quiet cockpit concept.

Flight Data Collection

PM duties include collection and recording of flight information such as, Block Out/In times, Fuel burns, etc. A CMS-enabled EFB can quietly capture this information and present it at the conclusion of the flight.

Sample benefits which might be provided to a CMS-enabled EFB equipped single pilot may be available in the following flight regimes:

Potential EFB Functions Made Possible by the CMS Wireless Data Bus

TABLE 2

| Flight Regime | Function | Sample Input (Condition observed by CMS or Spoken by Pilot) | Sample Output (Action taken by CMS or Audio Spoken by CMS to Pilot) |
|---|---|---|---|
| Pre-Flight | Audio checklist | "FlowCheck: Pre-Start" | "Power Levers: Flight Idle" (item missed) or "Pre-Start FlowCheck: Complete" |
| | Log initial states (fuel on board, hours, location) | Batteries turned on | Fuel indications read and stored |
| | Weight & Balance | "Passenger Weights: 400, 0, 360" (by row from cockpit rearward), "Baggage Weight: 125" | "Aircraft within takeoff Weight and Balance limits" (system knows fuel load) |
| | Takeoff performance calculator | "Takeoff Data: Runway 13, wind 090 at 13, temp 18" | "Distance available: 7,000, Distance required: 4,800 or 68% of available" TOLD Data |

TABLE 2-continued

| Flight Regime | Function | Sample Input (Condition observed by CMS or Spoken by Pilot) | Sample Output (Action taken by CMS or Audio Spoken by CMS to Pilot) |
|---|---|---|---|
| | | | displayed: Vr 85, V50 103, Vfs 123, Vyse 124" |
| Engine Start | Engine start monitor/alert | Oil Pressure zero after 10 seconds | "Alert: Left Oil Pressure Low" |
| | Engine start monitor/alert | Peak temp noted | "Peak temp: 605" |
| Taxi | Block Out time capture | GPS speed exceeds 10 mph | Time captured |
| | Taxiway situational awareness | "Say taxiway position" | "Taxiway Charlie, Approaching Hotel" |
| Takeoff | Audio checklist | "FlowCheck: Line-up" | "Line-up FlowCheck: Complete . . . crosswind from the right at 10 knots" |
| | Runway ID | TOGA power set/on ground, heading compared to Runway designation | "Alert: Not on Runway XX" |
| | Airspeed callouts | TOGA power set/ accelerating | "Airspeed Alive", "Rotate", "Positive Rate", "VFS" |
| | Takeoff performance monitoring/alerting | Acceleration slower than heuristically derived expectation | "Alert: Acceleration Slow" |
| | Liftoff time capture | Positive Rate of Climb | "Positive Rate"; Time Captured |
| Climb | Audio checklist | Passing FL180 | "Check Oxygen Masks" |
| | Pressurization Monitor | Aircraft altitude > Airport elevation plus 1,000 ft AND (Differential pressure = 0 OR Cabin ROC = Aircraft ROC) | "Alert: Cabin Pressurization Failure" |
| | Climb optimization | "Calculate Optimum Climb Profile" | "Target speed plus 8" |
| Cruise | Audio checklist | 20 minutes following level-off | "Check Fuel Balance" |
| | Engine/systems trend monitoring | Engine/systems readings logged every 10 minutes | Database available for download & analysis |
| | Fuel Status | "Check Fuel Status" | "Estimated Reserve at Destination: 355 pounds" |
| | Altitude alerts | Altitude deviation | "Check altitude" |
| Descent | Audio checklist | "Descent Checklist" | "Pressurization: Set" |
| | Top of Descent planning/alerting | Distance to destination < (Altitude-Field Elevation) × 3 | "Top of Descent" |
| Approach | Audio checklist | "Check" | "Landing Gear Down" |
| | Maneuvering airspeed monitor/alerting | "Set Target Speed One Four Five" | "Target speed plus 25" if no deceleration noted within 15 seconds |
| | Approach stabilization monitor (Vref, LOC, GS, Config, Engines Spooled up, Descent Rate) | 1000 feet above airport elevation "Monitor Approach" | "Ref plus five, sinking 700"; "Left of course"; "Below glideslope" |
| | GPS based approach monitor | Prior to FAF, pilot says, "Approach parameters", CMS prompts for FAF crossing altitude, inbound track, distance to MAP, MAP altitude; At FAF, pilot says, "Approach active" | Given 3D GPS coordinates, CMS can monitor approach against synthetic glideslope/LOC path and call out variance from desired path and "500 above", "Minimums", "Missed Approach Point" |

TABLE 2-continued

| Flight Regime | Function | Sample Input (Condition observed by CMS or Spoken by Pilot) | Sample Output (Action taken by CMS or Audio Spoken by CMS to Pilot) |
|---|---|---|---|
| Landing | Audio checklist | "FlowCheck: Before Landing" | "Before Landing FlowCheck: Complete" |
| | Landing quality monitor | Touchdown point, speed, vertical and horizontal accelerations noted at landing | "Lateral and Vertical G's less than 0.2: Nice Landing" |
| | Obstacle awareness/ collision warning | Strobe light detected on runway during night landing | "Traffic On Runway" |
| | Touchdown time capture | Speed below 20 kts | Time of landing recorded |
| Taxi | Audio checklist | "Check" | "Retract Flaps" |
| | Taxiway situational awareness | "Say taxiway position" | "Taxiway Charlie, approaching Hotel" |
| | Obstacle awareness/ collision warning | Forward looking video detects object ahead | "Alert: Obstacle Ahead" |
| | Audio checklist | "FlowCheck: After Landing" | "Power Lever: Shutoff" |
| All Operations | Heading Monitor | Pilot says, "Set Heading Target three two two" | Target heading set to 322; if not turning toward 322 within 10 seconds AND not within 5 degrees in 20 seconds: "Left of track 8 degrees" |
| | Assigned Heading Intercept | Pilot reads back, "Heading one eight zero" . . . EFB Display: HEADING 180/CONFIRM | If confirmed, target heading set to 180; if not turning toward 180 within 10 seconds AND not within 5 degrees in 20 seconds: "Assigned heading, one eight zero" |
| | Assigned Altitude Intercept | Pilot reads back, "Maintain Five Thousand" . . . EFB Display: ALTITUDE 5000/CONFIRM | If confirmed, target altitude set to 5000; if not climbing/descending toward 5000 within 10 seconds, "Assigned altitude five thousand" |
| | Assigned Speed Intercept | Pilot reads back, "One Two Zero Knots" . . . EFB Display: SPEED 120 KTS/CONFIRM | If confirmed, target speed set to 120; if speed not moving toward 120 within 10 seconds AND not within 5 knots in 20 seconds: "Assigned speed, One Two Zero Knots" |
| | Alarm triage | Multiple Alarms detected | Alarms ranked ordered in importance |
| | Audio output delay | ATC transmission detected | CMS queues audio messages |
| Flight Review | Flight playback | Download/playback flight for after flight review | Graphical, audio, video playback of flight (e.g. See You) |
| | Risk awareness/ mitigation | Semi-automated post flight analysis which identifies risk | Statistical assessment of risk exposures and recommended steps to mitigate risks |
| | Flight Standards Quality Assessment | Safety scoring grades the pilot's performance | Safety Score: 92% |
| Recurrent Training | Automated safety audit/ risk exposure rating | Electronic record of previous 6/12 months flights assessed | Average Safety Score for last 127 flights and 225 flight hours: 97% |
| | Individualized Learning Plan | Risk factor analysis and recommended skill improvement plan | Recommended Risk Mitigation Plan: 1) Reduce tendency to use excessive bank |

TABLE 2-continued

| Flight Regime | Function | Sample Input (Condition observed by CMS or Spoken by Pilot) | Sample Output (Action taken by CMS or Audio Spoken by CMS to Pilot) |
| --- | --- | --- | --- |
| | | | angle during approach to landing (6 events), 2) Improve speed control during final approach (9 events) |
| | Benchmarking | Compares pilot performance to larger community | Pilot Safety Ranking: $88^{th}$ percentile |
| | Flight playback | Graphical, audio and video replay of risk events | Playback excessive bank angle incident in real-time to aid learning |
| | Flight skills trend analysis | Compare pilot skills improvement over longer time horizon | Graphical presentation of pilot's risk event incidents over multiple years |

CONCLUSION

The 2019 Aircraft Electronics Association Avionics Market Report, Worldwide Business & General Aviation Avionics Sales reported $3 billion in sales, split between retrofit and forward-fit aircraft. There are more than 584,000 active pilots and 200,000 general aviation aircraft in service in the United States. General aviation pilots are aware of advances in high-end avionics, yet the vast majority of small aircraft owners do not have the resources to significantly upgrade their aircraft. High costs, significant regulatory hurdles and, in many cases, the lack of a business justification stand between these owners and advanced avionics suites.

Thankfully, the recent advent of iPad enabled Electronic Flight Bags bridged some of the gap between poorly performing legacy avionics and modern capabilities. Pilots responded by purchasing and adopting EFB technology at a rapid pace. The addition of a Cockpit Multi Sensor as described herein is a logical next step in the rapid evolution of non-certified general aviation iPad enabled pilot avionics.

From an engineering perspective, a go-to-market version of CMS can be achieved by integrating existing technologies and applying standard component packaging. The key challenges and opportunities will be achieving the twin goals of a) applying appropriate machine vision technologies to scrape and digitize data from video of cockpit displays, and b) devising a robust CMS Wireless Data Bus protocol that will meet the long-term needs of general aviation. If successful, this protocol will become the de facto standard for sensor-to-EFB communication, allow for extensive growth and become valuable intellectual property.

From a business perspective, an early market entry of CMS will establish a significant market share in a new category of avionics. With an installed base of units occupying the overhead real estate of general aviation aircraft and a proprietary communication protocol, the CMS venture will be well positioned to become the go-to player in the non-certified Part 91 and experimental markets for advanced features linking iPad enabled applications to legacy avionics, aircraft systems instrumentation and controls. The result will be a low-cost solution that offers advanced electronic cockpit functionality, reduced pilot workload and enhanced safety.

The potential merit of a Cockpit Multi Sensor product as described herein justifies developing a Business Plan to better understand and quantify the economic opportunity.

Supplement A: Chart of Current iPad Enabled Capabilities
"TECHNOLOGY: IPAD BEST PRACTICES, MAKING TECHNOLOGY WORK FOR YOU", AOPA Pilot Magazine, Dave Hirschman, Nov. 5, 2014

IFR with full ADS-B
1. Check weather, file flight plan
2. Enter route waypoints into avionics
3. Takeoff: Tablet set to an approach procedure for the departure airport or, at a non-towered airport, full-screen traffic (Note: Weather and traffic may not be available on ground)
4. Cruise: Moving map (IFR en-route chart) with weather and traffic overlays; or VFR sectional for added detail
5. Reroutes: Find new waypoints on tablet and view the route graphically
6. Approach: Geo-referenced approach plate, or Synthetic Vision
7. After landing: Airport diagram VFR with full ADS-B
1. Check weather and TFRs
2. Enter route waypoints into avionics
3. Takeoff: Full-screen traffic
4. Cruise: Moving map page with weather and traffic overlays
5. Approach: Traffic page in daytime/SynVis or Terrain at night or in mountains
6. After landing: Airport diagram IFR with ADS-B weather
1. Check weather, file flight plan
2. Enter route waypoints into avionics
3. Takeoff: Tablet set to an approach procedure for the departure airport
4. Cruise: En-route chart with FIS-B weather
5. Approach Geo-referenced approach plate or Synthetic Vision
6. After landing: Airport diagram VFR with ADS-B weather
1. Check weather and TFRs
2. Takeoff: VFR sectional with FIS-B weather
3. Cruise: VFR sectional with FIS-B weather
4. Approach: Synthetic Vision or Terrain, especially at night or near mountains
5. After landing: Airport diagram Supplement B: Ride Reporter Being rigidly attached to the cockpit ceiling structure, the CMS Core Unit has the requisite acceleration sensors, computational power, storage and radio transmission capabilities to sense, characterize, record and transmit accelerations experienced by the aircraft in flight.

System Description

Figure 16:
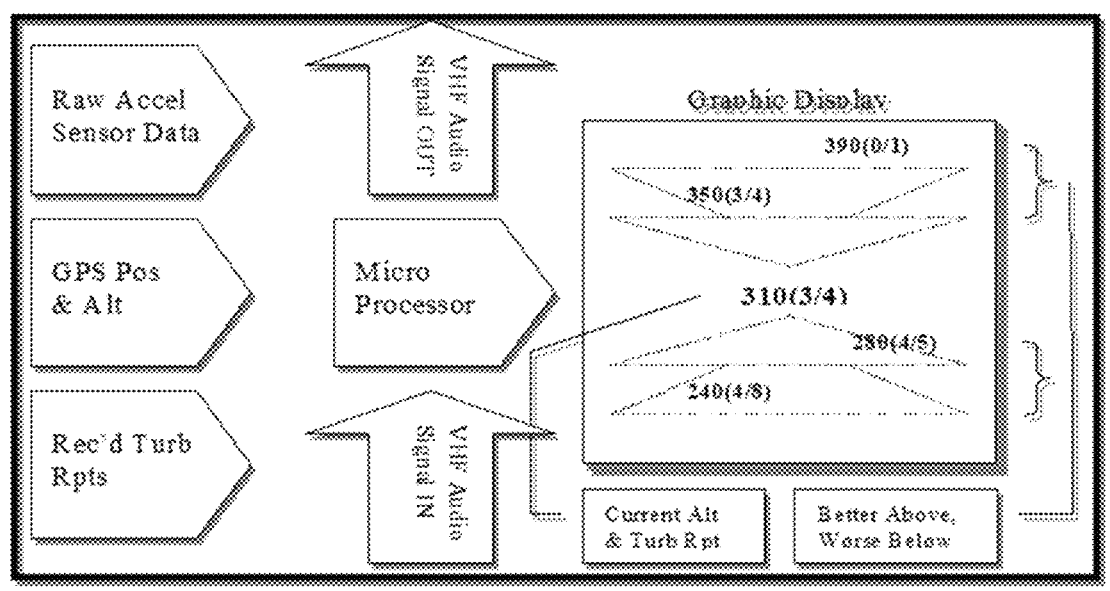
FIG. 16 illustrates a block diagram of Ride Reporter that may be integrated into electronic flight assistant system.

As illustrated in FIG. 16, Ride Reporter consists of (a) one or more accelerometers, (b) interface hardware to transmit acceleration data to an information processor, (c) input provisions to capture location and altitude data from GPS or other sensors, (d) transmit and receive burst modems, (e) in-line connections for communications link and (d) output provision to a graphic display. Ride Reporter will collect and transmit reports of turbulence encountered and receive and display reports of other aircraft Ride Reporter turbulence reports. No method or system currently exists to collect and share objective measurements of turbulence reports from aircraft in near-real-time.

A large percentage of radio communication among pilots and air traffic controllers concerns the exchange of subjective turbulence reports. Pilots use this information to select routes and altitudes they believe will provide their passengers the smoothest ride available. In areas of widespread turbulence, transmissions concerning "ride reports" consume a large fraction of radio conversation. Ride Reporter addresses these issues by: 1) establishing an objective measure of turbulence, 2) reducing the amount of voice traffic associated with ride reports, 3) providing more useful and timely information to flight crews and, 4) improving safety by diminishing flight crew workload.

Initial versions of the sensors will be self-contained and transmit relevant data through existing VHF voice channel communications via Data Under Voice (DUV) or by appending a short encoded data burst at the conclusion of each voice transmission. Likewise, data can be received from other aircraft in the vicinity broadcasting turbulence data on channel. The coordinates, altitude and intensity of turbulence can then be displayed in a graphical form on any of several devices such as EFB's.

In-flight ride reports are currently given using a subjective scale of "light, moderate, severe and extreme", terms described in the Airman's Information Manual. These judgments are further modified by the adjectives "occasional, intermittent and continuous". Since these criteria are determined by effects on the aircraft, the same report of "moderate turbulence" by a Boeing 757 conveys a very different meaning than the same report coming from a Cessna 172. Recipients of these reports must adjust these reports to compensate for differences in the type of aircraft flown by the crew making the reports. Ride Reporter, in contrast, will provide an objective measurement of turbulence. A proprietary algorithm reduces raw accelerometer data, aircraft speed, wing loading and other factors into a readily understood format that will augment or replace the subjective scale.

Later versions of Ride Reporter may be incorporated into future avionics suites to display the turbulence data overlaid with other flight information, such as weather radar, collision avoidance, terrain hazards and navigational data.

Ultimately, widespread collection and transmission of near-real-time turbulence data may increase the fidelity of weather prediction models and assist in weather forecasting.

Commercial and General Aviation flight crews will benefit by having better access to more objective, near-real-time ride reports to locate and take advantage of smoother air.

In addition to Ride Reporter's ability to communicate an accurate situational awareness of turbulence, it will also offer other benefits:

Fleet-Wide Ride Reporter

Turbulence reports from thousands of aircraft in operation could constitute a valuable proprietary database. Retaining marketing and ownership rights to the information will permit sale to airlines and forecasting organizations, which otherwise have poor access to vertical air movement data. (Although airline dispatchers attempt to provide altitude and route recommendations to avoid turbulence, anecdotal information received by crews chatting over ATC frequencies is still the primary source of data for real-time decision-making.)

Flight Planning Tool

The addition of Ride Reporter capability to a national community of users will also offer unique capabilities as a flight planning tool. Ride Reporter data could be ported to FltPlan.com and other flight planning services and weather forecasting organizations. Data from thousands of participating aircraft will be more timely and higher resolution than RAOB data gathered by NWS via twice daily balloon launches from a mere 200 sites nationwide. In effect, each Ride Reporter equipped aircraft will be leaving the equivalent of a 'trail of breadcrumbs' describing the flight conditions along its entire route from lift-off to touch-down.

In the end, the resolution of the Ride Reporter-derived data will be an important flight planning tool. Prior to takeoff and during flight, a Ride Reporter equipped pilot can call up the following data page, either calculated on-board or received from a remote server:

TABLE 3

Flight Planning

|  | Current Flight Plan | Best Time | Best Fuel | Best Ride | Best Ride Within XX Add'l Minutes |
|---|---|---|---|---|---|
| Cruise Altitude | 370 | 290 | 390 | 330 | 330 |
| NM Remaining | 842 | 842 | 842 | 842 | 865 |
| Fuel to Dest | 405 | 425 | 390 | 415 | 433 |
| Ride (Avg/Worst) | 3/4 | 4/5 | 3/4 | 1/2 | 0/1 |
| Time to Dest | 2:14 | 2:09 | 2:22 | 2:18 | 2:28 |

If the pilot selects "Best Ride Within XX Add'l Minutes", the flight plan map and waypoint page will depict the recommended rerouting. This degree of lateral and vertical guidance does not currently exist, nor is the requisite real-time data available. A flight planning tool such as this will enable operators to deliver an optimal balance of better rides, better economy and better speed to its passengers.

Takeoff Performance Monitoring

Ride Reporter acquired acceleration data will allow iPad enabled automatic real-time takeoff performance calculation to augment conventional V1 calculation and corresponding Rejected Takeoff Off (RTO) display. Today, this important safety feature is only available on aircraft equipped with high-end avionics suites.

Braking Performance

Cumulative deceleration data can be compared to individual and fleet brake wear rates to help monitor and improve brake performance.

Accident/Incident Analysis

Ride Reporter can also record acceleration data for use as a Flight Data Recorder by inclusion of hardened non-volatile memory. Data recorded prior to an accident can be used by investigators to help determine causes and more precisely characterize the forces of the impact.

Landing Quality

Owner/operators will benefit from being able to quantify and appraise their own touchdown performance (as well as renters and lessees). Pilots focus considerable attention on improving their landing skills. Ride Reporter can characterize and report on the smoothness of landings by analyzing accelerations from immediately before to immediately after touchdown. An algorithm will factor in turbulence prior to touchdown and landing forces at touchdown to score the landing and report a Landing Quotient. The display could be configured to provide the Landing Quotient for the previous landing, an average of the prior X landings and the best/worst in the previous Y landings. A graphic display of the accelerations during the last several seconds prior to touchdown will provide a new insight for the pilot into his/her landing finesse.

Maintenance Value

Compilation of fleet-wide acceleration data for a given make/model of aircraft will allow assessment of actual airframe loads due to in-flight turbulence and landing loads. Measured in very fine time increments, acceleration data can also be used to measure vibration (measured in inches per second) transmitted through the airframe. This information will be useful for maintenance diagnostic purposes, including telltale health indications for: Propeller balance, crankshaft balance, airframe vibration and wheel balance.

What is claimed is:

1. An electronic flight assistant comprising:
a first processor coupled to a firmware memory containing machine readable instructions executable by the processor and a random access memory (RAM);
an electronic camera coupled to the processor;
a visible-wavelength laser adapted to be gated and scanned by the processor;
a switchable cockpit light;
at least one digital radio coupled to the processor; and
a housing containing the processor, electronic camera, laser, digital radio, and cockpit light;
the processor configured to perform optical reading of cockpit instruments using images from the electronic camera, to determine error conditions from the optically-read cockpit instruments, and to scan the laser to provide indications to a pilot of an error condition by highlighting instruments or controls relevant to the error.

2. The electronic flight assistant of claim 1 further comprising a carbon monoxide sensor coupled to the processor, and wherein the error condition is determined if carbon monoxide levels exceed a threshold.

3. The electronic flight assistant of claim 1 wherein the cockpit instruments the processor is configured to optically read include at least one instrument selected from the group consisting of horizontal situation indicators, directional gyros, turn and bank indicators, airspeed indicators, altimeters, fuel gauges, oil pressure gauges, and ammeters.

4. The electronic flight assistant of claim 1 wherein the electronic camera is configured to generate the images of the cockpit instruments using infrared light and further comprising an infrared illuminator configurable to illuminate the cockpit instruments the processor is configured to optically read.

5. The electronic flight assistant of claim 4 further comprising an electronic compass and a global positioning system receiver.

6. The electronic flight assistant of claim 5 wherein the processor is further configured to perform optical traffic detection using the camera.

7. The electronic flight assistant of claim 6 further adapted to provide digital audio tones and system voice message audio to the digital radio.

8. The electronic flight assistant of claim 1 further comprising a second unit comprising:
a second processor;
a second unit digital radio;
and a second unit electronic camera;
the second unit configured to provide data selected from the group consisting of optical readings of instruments and images of instruments, the data obtained by the second unit electronic camera and second processor, the data provided to the first processor over the second unit digital radio.

9. The electronic flight assistant of claim 1 wherein the at least one digital radio comprises a digital radio configurable to operate according to IEEE 802.11 standards and connect to a portable electronic device in a configuration mode, and wherein the processor is configured to provide configuration menus to a web browser on the portable electronic device over the digital radio when in the configuration mode.

10. An electronic flight assistant comprising:
a first processor coupled to a firmware memory containing machine readable instructions executable by the processor and a random access memory (RAM);
an electronic camera coupled to the processor;
a visible-wavelength laser adapted to be gated and scanned by the processor;
a switchable cockpit light; at least one digital radio coupled to the processor; and
a housing containing the processor, electronic camera, laser, digital radio, and cockpit light;
the processor configured to perform optical reading of cockpit instruments using images from the electronic camera, and to determine error conditions from the optically-read cockpit instruments; and
the processor configured to use a predefined database of instruments to identify cockpit instrument types and to recognize data presented by each cockpit instrument;
wherein the processor is further configured to scan the laser to provide indications to a pilot of an error condition by highlighting instruments or controls relevant to the error.

11. An electronic flight assistant comprising:
a first processor coupled to a firmware memory containing machine readable instructions executable by the processor and a random access memory (RAM);
an electronic camera coupled to the processor;
a visible-wavelength laser adapted to be gated and scanned by the processor;
a switchable cockpit light; at least one digital radio coupled to the processor; and
a housing containing the processor, electronic camera, laser, digital radio, and cockpit light;
the processor configured to perform optical reading of cockpit instruments using images from the electronic camera, to determine error conditions from the optically-read cockpit instruments, and to scan the laser to provide indications to a pilot of an error condition by highlighting instruments or controls relevant to the error;

the electronic flight assistant configured for retrofit to existing aircraft by replacement of previously-existing cockpit lighting devices.

\* \* \* \* \*